(12) United States Patent
Beauharnois

(10) Patent No.: US 8,007,732 B2
(45) Date of Patent: Aug. 30, 2011

(54) EXHAUST GAS TREATMENT DEVICE

(75) Inventor: Mark Beauharnois, Buffalo, NY (US)

(73) Assignee: Unifrax 1 LLC, Niagara Falls, NY (US)

(*) Notice: Subject to any disclaimer, the term of this patent is extended or adjusted under 35 U.S.C. 154(b) by 552 days.

(21) Appl. No.: 12/201,018

(22) Filed: Aug. 29, 2008

(65) Prior Publication Data

US 2009/0060802 A1  Mar. 5, 2009

Related U.S. Application Data

(60) Provisional application No. 60/967,136, filed on Aug. 31, 2007, provisional application No. 61/085,226, filed on Jul. 31, 2008.

(51) Int. Cl.
*B01D 53/94* (2006.01)
*B01D 53/34* (2006.01)
*F01N 3/28* (2006.01)

(52) U.S. Cl. ......... 422/179; 422/180; 422/221; 60/299; 60/300; 428/221; 428/688; 428/920; 428/921; 442/410

(58) Field of Classification Search .......... 422/177, 422/179, 180, 221; 60/299, 300; 428/221, 428/688, 920, 921; 442/410
See application file for complete search history.

(56) References Cited

U.S. PATENT DOCUMENTS

| | | | |
|---|---|---|---|
| 3,458,329 A | 7/1969 | Owens et al. | |
| 4,317,575 A | 3/1982 | Cavicchio | |
| 5,332,699 A | 7/1994 | Olds et al. | |
| 5,384,188 A | 1/1995 | Lebold et al. | |
| 5,389,716 A | 2/1995 | Graves | |
| 5,482,686 A * | 1/1996 | Lebold et al. | 422/179 |
| 5,580,532 A * | 12/1996 | Robinson et al. | 422/179 |
| 5,585,312 A | 12/1996 | TenEyck et al. | |
| 5,714,421 A | 2/1998 | Olds et al. | |
| 5,811,063 A * | 9/1998 | Robinson et al. | 422/179 |
| 5,811,360 A | 9/1998 | Jubb | |
| 5,821,183 A | 10/1998 | Jubb | |
| 5,874,375 A | 2/1999 | Zoitos et al. | |
| 5,928,075 A | 7/1999 | Miya et al. | |

(Continued)

FOREIGN PATENT DOCUMENTS

DE  295 15 081 U1  9/1995

(Continued)

OTHER PUBLICATIONS

International Preliminary Report on Patentability, Form PCT/IB/373, for PCT International Patent Application No. PCT/US2008/010242 corresponding to U.S. Appl. No. 12/201,018, mailing date Mar. 2, 2010.

(Continued)

*Primary Examiner* — Nina Bhat
(74) *Attorney, Agent, or Firm* — Curatolo Sidoti Co., LPA; Salvatore A. Sidoti; Peter R. Detorre

(57) ABSTRACT

A mounting mat for an exhaust gas treatment device including inorganic fibers, organic binder, antioxidant, optionally clay and optionally intumescent material. The exhaust gas treatment device includes a housing, a fragile catalyst support structure resiliently mounted within the housing, and the mounting mat disposed in a gap between the housing and the fragile catalyst support structure. Additionally disclosed are methods of making a mounting mat for an exhaust gas treatment device and for making an exhaust gas treatment device incorporating the mounting mat.

72 Claims, 5 Drawing Sheets

U.S. PATENT DOCUMENTS

| | | | |
|---|---|---|---|
| 5,955,389 | A | 9/1999 | Jubb |
| 6,025,288 | A | 2/2000 | Zoitos et al. |
| 6,030,910 | A | 2/2000 | Zoitos et al. |
| 6,231,818 | B1 * | 5/2001 | TenEyck .................. 422/179 |
| 6,855,298 | B2 * | 2/2005 | TenEyck .................. 422/179 |
| 6,861,381 | B1 | 3/2005 | Jubb et al. |
| 6,953,757 | B2 | 10/2005 | Zoitos et al. |
| 7,033,412 | B2 * | 4/2006 | Kumar et al. .................. 55/523 |
| 7,153,796 | B2 | 12/2006 | Jubb et al. |
| 7,259,118 | B2 | 8/2007 | Jubb et al. |
| 7,261,864 | B2 * | 8/2007 | Watanabe .................. 422/179 |
| 7,276,280 | B2 * | 10/2007 | Dinwoodie et al. .......... 428/221 |
| 7,442,347 | B2 * | 10/2008 | Yoshimi et al. .............. 422/179 |
| 7,550,118 | B2 * | 6/2009 | Merry ..................... 422/179 |

FOREIGN PATENT DOCUMENTS

| | | |
|---|---|---|
| DE | 195 38 542 C2 | 9/1996 |
| EP | 07/06979 A1 | 4/1996 |
| GB | 2 200 129 A | 7/1988 |
| WO | WO-00/33946 A1 | 6/2000 |
| WO | WO-03/031368 A2 | 4/2003 |

OTHER PUBLICATIONS

International Search Report dated Dec. 17, 2008 from corresponding PCT International Application No. PCT/US2008/010242, International filing date Aug. 29, 2008 for applicant UNIFRAX I LLC.

* cited by examiner

EXHAUST GAS TREATMENT DEVICE

CROSS REFERENCE TO RELATED APPLICATIONS

This application claims the benefit of the filing date under 35 U.S.C. §119(c) from U.S. Provisional Application For Patent Ser. No. 60/967,136 filed Aug. 31, 2007 and from U.S. Provisional Application For Patent Ser. No. 61/085,226 filed Jul. 31, 2008, both of which are incorporated herein by reference.

TECHNICAL FIELD

A device for the treatment of exhaust gases, such as a catalytic converter or a diesel particulate trap. The device includes a fragile structure mounted within a housing by a mounting mat that is disposed in a gap between the housing and the fragile structure.

BACKGROUND

Exhaust gas treatment devices are used on automobiles to reduce atmospheric pollution from engine emissions. Examples of widely used exhaust gas treatment devices include catalytic converters and diesel particulate traps.

A catalytic converter for treating exhaust gases of an automotive engine includes a housing, a fragile catalyst support structure for holding the catalyst that is used to effect the oxidation of carbon monoxide and hydrocarbons and the reduction of oxides of nitrogen, and a mounting mat disposed between the outer surface of the fragile catalyst support structure and the inner surface of the housing to resiliency hold the fragile catalyst support structure within the housing.

A diesel particulate trap for controlling pollution generated by diesel engines generally includes a housing, a fragile particulate filter or trap for collecting particulate from the diesel engine emissions, and a mounting mat that is disposed between the outer surface of the filter or trap and the inner surface of the housing to resiliently hold the fragile filler or trap structure within the housing.

The fragile structure generally comprises a monolithic structure manufactured from a frangible material of metal or a brittle, ceramic material such as aluminum oxide, silicon dioxide, magnesium oxide, zirconia, cordierite, silicon carbide and the like. These materials provide a skeleton type of structure with a plurality of gas flow channels. These monolithic structures can be so fragile that even small shock loads or stresses are often sufficient to crack or crush them. In order to protect the fragile structure from thermal and mechanical shock and other stresses noted above, as well as to provide thermal insulation and a gas seal, a mounting mat is positioned within the gap between the fragile structure and the housing.

The mounting mat materials employed should be capable of satisfying any of a number of design or physical requirements set forth by the fragile structure manufacturers or the exhaust gas treatment device manufacturers. For example, the mounting mat material should be capable of exerting an effective residual holding pressure on the fragile structure, even when the exhaust gas treatment device has undergone wide temperature fluctuations, which causes significant expansion and contraction of the metal housing in relation to the fragile structure, which in turn causes significant compression and release cycles for the mounting mats over a period of time.

Ceramic and metallic substrates used in exhaust gas treatment devices are most often mounted within a metal housing with an inorganic fiber based mounting mat. This mounting mat material may contain only inorganic fibers. However, the mounting mat material may also contain other types of fibers, organic binders, inorganic binder and intumescent materials.

The mounting mat must function across a wide range of operating temperatures to effectively hold the substrate in position. Substrates are subjected to axial forces acting on the substrate due to vibrations. The mounting mat also compensates for the fact that the metal housing expands more or less than the substrate itself. Various exhaust gas treatment devices operate throughout a temperature range of ambient conditions 20° C. to about 1200° C. Therefore, mounting mats must provide robust holding pressure performance across this wide temperature range.

As low temperature applications become more prevalent either from more efficient engine design or an increase in popularity of diesel powered vehicles, the desire for mounting mats that perform well at both low and high temperatures has increased.

For low temperature exhaust gas treatment device applications, such as diesel particulate traps or diesel catalyst structures, while these devices do not reach the temperatures provided in high temperature catalytic converters, the weight of the fragile structure and loading techniques employed require the mounting mat have a effective residual minimum holding pressure. In these applications, a higher minimum shear strength for the mounting mat of at least about 25 kPa is preferably achieved to prevent that fragile structure from being dislodged and damaged. The coefficient of friction of these mat products in such high G-load applications with heavy substrates is still approximately 0.45 in the in-use condition. Therefore, a mounting mat for this type of application should have an effective residual minimum holding pressure after 1000 cycles of testing at a temperature of about 300° C. of at least about 50 kPa.

In low temperature applications, such as turbocharged direct injection (TDI) diesel powered vehicles, the exhaust temperature is typically about 150° C. and may never exceed 300° C. It has been observed in the field that catalytic converters, that are assembled with typical intumescent mats, fail with an unexpectedly high frequency.

One reason for these failures is that the exhaust temperature is too low to expand the intumescent material, typically vermiculite particles. This has even been found in converters that have been pre-heated to about 500° C. to pre-expand the intumescent particles. When subsequently used in the low temperature applications, the mats fail to provide sufficient pressure against the fragile structure and thus fail. At temperatures above 350° C., the intumescent particles expand and increase the holding force of the mat against the fragile structure.

Flexibility is achieved by impregnating a mounting mat with various organic binders. However, exhaust gas treatment devices have suffered from poor low temperature performance (<300° C.) due to the presence of organic binder in the mat products, which degrade and cause a loss in the holding force. From room temperature to about 200° C. the loss in holding force is gradual. However, the loss in holding force is rapid from about 200° C. to about 250° C.

Previous attempts have been made at improving the low temperature performance of mounting mat materials for exhaust gas treatment devices. One such attempt involves including expanding particles in the mounting mat which expand (that is, increase in volume) throughout the temperature range where the organic binder has a negative impact. Unfortunately, such expanding particles continue to expand at temperatures well above the temperatures at which the organic binders exhibit their negative impact on mat performance.

What is needed in the industry is a flexible mounting mat for exhaust gas treatment devices which can be easily installed and which can function across a wide range of inlet gas temperatures without a significant loss in mat thickness and corresponding holding pressure performance.

SUMMARY

Provided is a mounting mat for an exhaust gas treatment device, the mounting mat comprising inorganic fibers, organic binder, antioxidant and optionally intumescent material.

According to certain illustrative embodiments, the mounting mat for the exhaust gas treatment device comprises inorganic fibers, organic binder, clay, antioxidant and optionally intumescent material.

Also provided is an exhaust gas treatment device, the device comprising a housing, a fragile catalyst support structure resiliency mounted within said housing, and mounting mat disposed in a gap between said housing and said fragile structure, wherein said mounting mat comprises inorganic fibers, organic binder, antioxidant and optionally intumescent material.

According to certain illustrative embodiments, the exhaust gas treatment device comprises a housing, a fragile catalyst support structure resiliently mounted within said housing, and mounting mat disposed in a gap between said housing and said fragile structure, wherein said mounting mat comprises inorganic fibers, organic binder, clay, antioxidant and optionally intumescent material.

Additionally provided is a method of making an exhaust gas treatment device, the method comprising (a) wrapping a mounting mat comprising (1) inorganic fibers, (2) organic binder, (3) antioxidant and (4) optionally intumescent material around a portion of a fragile structure adapted for treating exhaust gases; and (b) disposing the wrapped fragile structure within a housing, whereby the mounting mat holds the fragile structure resiliently within the housing.

According to certain illustrative embodiments, the method of making an exhaust gas treatment device comprises (a) wrapping a mounting mat comprising (1) inorganic fibers, (2) organic binder, (3) clay, (−1) antioxidant and (5) optionally intumescent material around a portion of a fragile structure adapted for treating exhaust gases; and (b) disposing the wrapped fragile structure within a housing, whereby the mounting mat holds the fragile structure resiliency within the housing.

further provided is an end cone for an exhaust gas treatment device comprising outer metallic cone; an inner metallic cone; and cone insulation disposed between said outer and inner metallic end cones, said cone insulation comprising inorganic fibers, organic binder, antioxidant and optionally intumescent material.

According to certain illustrative embodiments, the end cone for an exhaust gas treatment device comprises an outer metallic cone; an inner metallic cone; and cone insulation disposed between said outer and inner metallic end cones, said cone insulation comprising inorganic fibers, organic binder, clay, antioxidant and optionally intumescent material.

Further provided is an end cone for an exhaust gas treatment device comprising an outer metallic cone; and self-supporting cone insulation comprising inorganic fibers, antioxidant and optionally intumescent material disposed adjacent the inner surface of said outer metallic end cone.

According to certain illustrative embodiments, the end cone for an exhaust gas treatment device comprises an outer metallic cone; and self-supporting cone insulation comprising inorganic fibers, clay, antioxidant and optionally intumescent material disposed adjacent the inner surface of said outer metallic end cone.

DETAILED DESCRIPTION

A mounting mat for exhaust gas treatment device applications is disclosed. The mounting mat includes at least one ply or sheet that is comprised of heat resistant inorganic fibers, organic binder, and antioxidant. According to certain embodiments, the mounting mat may optionally include clay and/or an intumescent material. It has been unexpectantly found that the inclusion of an antioxidant in the mounting mat reduces the negative expansion of the mat experienced at temperatures of 350° C. and below. The mounting mat provides an improved holding pressure performance across a wide temperature range.

A device for treating exhaust gases is also provided. The device includes an outer metallic housing, at least one fragile structure that is mounted within the housing by a mounting mat that is disposed between the inner surface of the housing and the outer surface of the fragile structure. The term "fragile structure" is intended to mean and include structures such as metal or ceramic monoliths or the like which may be fragile or frangible in nature, and would benefit from a mounting mat such as is described herein.

Catalyst structures generally include one or more porous tubular or honeycomb-like structures mounted by a thermally resistant material within a housing. Each structure includes anywhere from about 200 to about 900 or more channels or cells per square inch, depending upon the type of exhaust treating device. A diesel particulate trap differs from a catalyst structure in that each channel or cell within the particulate trap is closed at one end or the other. Particulate is collected from exhaust gases in the porous structure until regenerated by a high temperature burnout process. Non-automotive applications for the mounting mat may include catalytic converters for chemical industry emission (exhaust) stacks.

Figure 1:
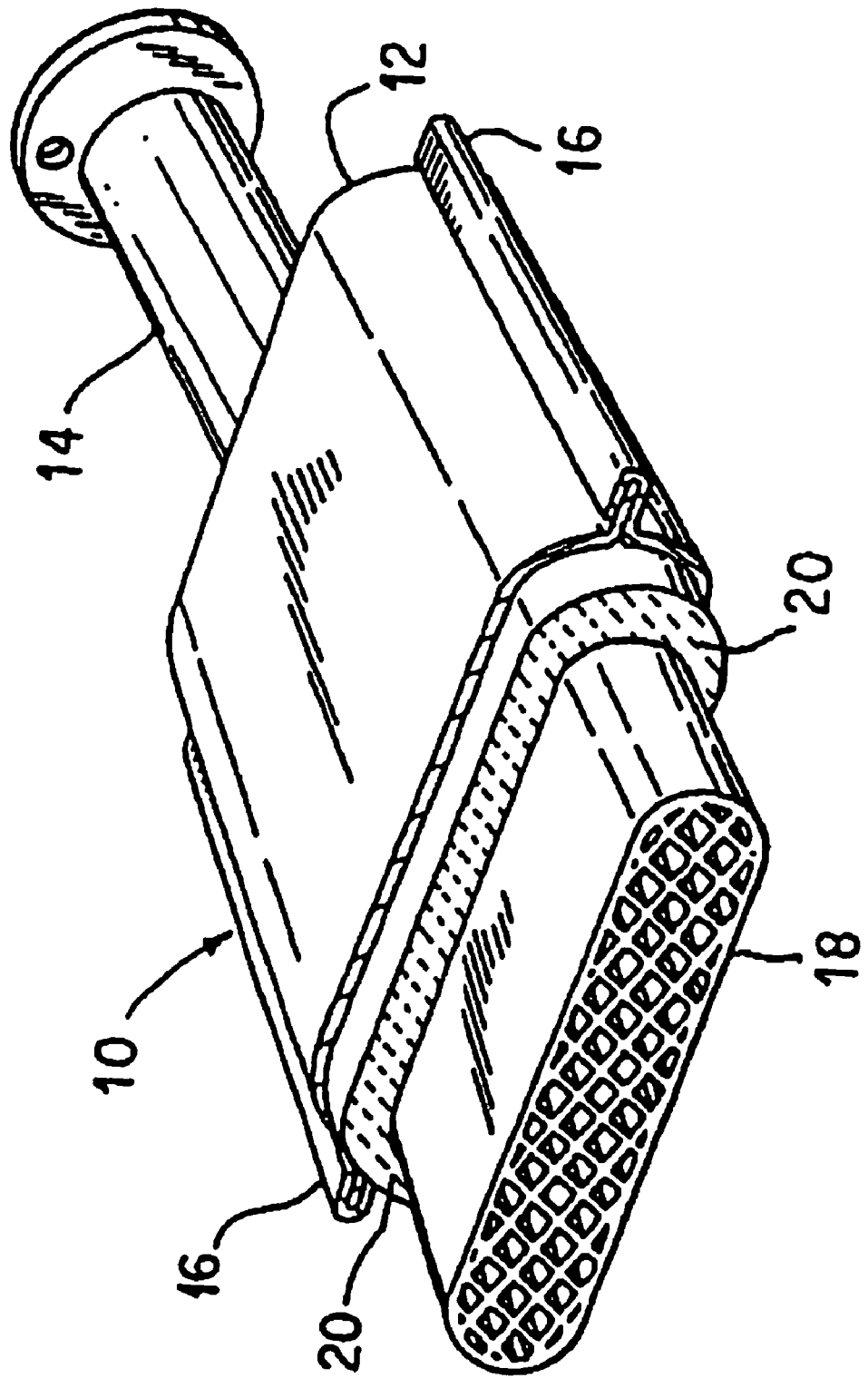
FIG. 1 shows a fragmentary view of an illustrative exhaust gas treatment device including the inventive mounting mat.

One illustrative form of a device for treating exhaust gases is designated by the numeral 10 in FIG. 1. It should be understood that the mounting mat is not intended to be limited to use in the device shown in FIG. 1, and so the shape is shown only as an illustrative embodiment. In fact, the mounting mat could be used to mount or support any fragile structure suitable for treating exhaust gases, such as a diesel catalyst structure, a diesel particulate trap, or the like.

Catalytic converter 10 may include a generally tubular housing 12 formed of two pieces of metal, for example, high temperature resistant steel, held together by flange 16. Alternatively, the housing may include a preformed canister into which a mounting mat-wrapped fragile structure is inserted. Housing 12 includes an inlet 14 at one end and an outlet (not shown) at its opposite end. The inlet 14 and outlet are suitable formed at their outer ends whereby they may be secured to conduits in the exhaust system of an internal combustion engine. Device 10 contains a fragile structure, such as a frangible ceramic monolith 18, which is supported and restrained within housing 12 by a mounting mat 20. Monolith 18 includes a plurality of gas pervious passages that extend axially from its inlet end surface at one end to its outlet end surface at its opposite end. Monolith 18 may be constructed of any suitable refractory metal or ceramic material in any known manner and configuration. Monoliths are typically oval or round in cross-sectional configuration, but other shapes are possible.

The monolith is spaced from inner surfaces of the housing by a distance or a gap, which will vary according to the type and design of the device utilized, for example, a catalytic converter, a diesel catalyst structure, or a diesel particulate trap. This gap is filled with a mounting mat 20 to provide resilient support to the ceramic monolith 18. The resilient mounting mat 20 provides both thermal insulation to the external environment and mechanical support to the fragile structure, thereby protecting the fragile structure from mechanical shock across a wide range of exhaust gas treatment device operating temperatures.

In general, the mounting mat includes inorganic fibers, optionally at least one type of intumescent material, organic binder, clay, and an antioxidant. The composition of the mounting mat 20 is sufficient to provide a holding pressure capability to resiliently hold the fragile catalyst support structure 18 within a housing 12 of an exhaust gas treatment device 10 throughout a wide temperature range.

Any heat resistant inorganic fibers may be utilized in the mounting mat so long as the fibers can withstand the mounting mat forming process, can withstand the operating temperatures of the exhaust gas treatment devices, and provide the minimum holding pressure performance for holding fragile structure within the exhaust gas treatment device housing at the operating temperatures. Without limitation, suitable inorganic fibers that may be used to prepare the mounting mat and exhaust gas treatment device include high alumina polycrystalline fibers, refractory ceramic fibers such as aluminosilicate fibers, alumina-magnesia-silica fibers, kaolin fibers, alkaline earth silicate fibers such as calcia-magnesia-silica fibers and magnesia-silica fibers, S-glass fibers, S2-glass fibers, E-glass fibers, quartz fibers, silica fibers and combinations thereof.

According to certain embodiments, the heat resistant inorganic fibers that are used to prepare the mounting mat comprise ceramic fibers. Without limitation, suitable ceramic fibers include alumina fibers, alumina-silica fibers, alumina-zirconia-silica fibers, zirconia-silica fibers, zirconia fibers and similar fibers. A useful alumina-silica ceramic fiber is commercially available from Unifrax I LLC (Niagara Falls, N.Y.) under the registered trademark FIBERFRAX. The FIBERFRAX ceramic fibers comprise the fiberization product of about 45 to about 75 weight percent alumina and about 25 to about 55 weight percent silica. The FIBERFRAX fibers exhibit operating temperatures of up to about 1540° C. and a melting point up to about 1870° C. The FIBERFRAX fibers easily formed into high temperature resistant sheets and papers.

The alumina silica fiber may comprise from about 40 weight percent to about 60 weight percent $Al_2O_3$ and about 60 weight percent to about 40 weight percent $SiO_2$. The fiber may comprise about 50 weight percent $Al_2O_3$ and about 50 weight percent $SiO_2$. The alumina/silica magnesia glass fiber typically comprises from about 64 weight percent to about 66 weight percent $SiO_2$, from about 24 weight percent to about 25 weight percent $Al_2O_3$, and from about 9 weight percent to about 10 weight percent MgO. The E-glass fiber typically comprises from about 52 weight percent to about 56 weight percent $SiO_2$, from about 16 weight percent to about 25 weight percent CaO, from about 12 weight percent to about 16 weight percent $Al_2O_3$, from about 5 weight percent to about 10 weight percent $B_2O_3$, up to about 5 weight percent MgO, up to about 2 weight percent of sodium oxide and potassium oxide and trace amounts of iron oxide and fluorides, with a typical composition of 55 weight percent $SiO_2$, 15 weigh percent $Al_2O_3$, 7 weight percent $B_2O_3$, 3 weight percent MgO, 19 weight percent CaO and traces of the above mentioned materials.

Without limitation, suitable examples of biosoluble alkaline earth silicate fibers that can be used to prepare a mounting mat for an exhaust gas treatment device include those fibers disclosed in U.S. Pat. Nos. 6,953,757, 6,030,910, 6,025,288, 5,874,375, 5,585,312, 5,332,699, 5,714,421, 7,259,118, 7,153,796, 6,861,381, 5,955,389, 5,928,075, 5,821,183, and 5,811,360, which are incorporated herein by reference.

According to certain embodiments, the biosoluble alkaline earth silicate fibers may comprise the fiberization product of a mixture of oxides of magnesium and silica. These fibers are commonly referred to as magnesium-silicate fibers. The magnesium-silicate fibers generally comprise the fiberization product of about 60 to about 90 weight percent silica, from greater than 0 to about 35 weight percent magnesia and 5 weight percent or less impurities. According to certain embodiments, the heat treated alkaline earth silicate fibers comprise the fiberization product of about 65 to about 86 weight percent silica, about 14 to about 35 weight percent magnesia and 5 weight percent or less impurities. According to other embodiments, the heat treated alkaline earth silicate fibers comprise the fiberization product of about 70 to about 86 weight percent silica, about 14 to about 30 weight percent magnesia, and 5 weight percent or less impurities. A suitable magnesium-silicate fiber is commercially available from Unifrax I LLC (Niagara Falls, N.Y.) under the registered trademark ISOFRAX. Commercially available ISOFRAX fibers generally comprise the fiberization product of about 70 to about 80 weight percent silica, about 18 to about 27 weight percent magnesia and 4 weight percent or less impurities.

According to certain embodiments, the biosoluble alkaline earth silicate fibers may comprise the fiberization product of a mixture of oxides of calcium, magnesium and silica. These fibers are commonly referred to as calcia-magnesia-silica fibers. According to certain embodiments, the calcia-magnesia-silicate fibers comprise the fiberization product of about 45 to about 90 weight percent silica, from greater than 0 to about 45 weight percent calcia, from greater than 0 to about 35 weight percent magnesia, and 10 weight percent or less impurities. Useful calcia-magnesia-silicate fibers are commercially available from Unifrax I LLC (Niagara Falls, N.Y.) under the registered trademark INSULFRAX. INSULFRAX fibers generally comprise the fiberization product of about 61 to about 67 weight percent silica, from about 27 to about 33 weight percent calcia, and from about 2 to about 7 weight percent magnesia. Other suitable calcia-magnesia-silicate fibers are commercially available from Thermal Ceramics (Augusta, Ga.) under the trade designations SUPER WOOL 607, SUPERWOOL 607 MAX and SUPERWOOL HT. SUPERWOOL 607 fibers comprise about 60 to about 70 weight percent silica, from about 25 to about 35 weight percent calcia, and from about 4 to about 7 weight percent magnesia, and trace amounts of alumina. SUPERWOOL 607 MAX fibers comprise about 60 to about 70 weight percent silica, from about 16 to about 22 weight percent calcia, and from about 12 to about 19 weight percent magnesia, and trace amounts of alumina. SUPERWOOL FIT fiber comprise about 74 weight percent silica, about 24 weight percent calcia and trace amounts of magnesia, alumina and iron oxide.

Suitable silica fibers use in the production of a mounting mat for an exhaust gas treatment device include those leached glass fibers available from BelChem Fiber Materials GmbH. Germany, under the trademark BELCOTEX, from Hitco Carbon Composites. Inc. of Gardena Calif., under the registered trademark REFRASIL, and from Polotsk-Steklovolokno, Republic of Belarus, under the designation PS-23(R).

The BELCOTEX fibers are standard type, staple fiber pre-yarns. These fibers have an average fineness of about 550 tex and are generally made from silicic acid modified by alumina. The BELCOTEX fibers are amorphous and generally contain about 94.5 silica, about 4.5 percent alumina, less than 0.5 percent sodium oxide, and less than 0.5 percent of other components. These fibers have an average fiber diameter of about 9 microns and a melting point in the range of 1500° to 1550° C. These fibers are heal resistant to temperatures of up to 1100° C. and are typically shot free and binder free.

The REFRASIL fibers, like the BELCOTEX fibers, are amorphous leached glass fibers high in silica content for providing thermal insulation for applications in the 1000° to 1100° C. temperature range. These fibers are between about 6 and about 13 microns in diameter, and have a melting point of about 1700° C. The fibers, after leaching, typically have a silica content of about 95 percent by weight. Alumina may be present in an amount of about 4 percent by weight with other components being present in an amount of 1 percent or less.

The PS-23 (R) fibers from Polotsk-Steklovolokno are amorphous glass fibers high in silica content and are suitable for thermal insulation for applications requiring resistance to at least about 1000° C. These fibers have a fiber length in the range of about 5 to about 20 mm and a fiber diameter of about 9 microns. These fibers, like the REFRASIL fibers, have a melting point of about 1700° C.

The intumescent material that may be incorporated into the mounting mat includes, without limitation, unexpanded vermiculite, ion-exchanged vermiculite, heat treated vermiculite, expandable graphite, hydrobiotite, water-swelling tetrasilicic flourine mica, alkaline metal silicates, or mixtures thereof. The mounting mat may include a mixture of more than on type of intumescent material. The intumescent material may comprise a mixture of unexpanded vermiculite and expandable graphite in a relative amount of about 9:1 to about 1:2 vermiculite:graphite, as described in U.S. Pat. No. 5,384,188.

The mounting mat also includes a binder or mixture of more than one type of binder. Suitable binders include organic binders, inorganic binders and mixtures of these two types of binders. According to certain embodiments, the intumescent mounting mat, includes one or more organic binders. The organic binders may be provided as a solid, a liquid, a solution, a dispersion, a latex, an emulsion, or similar form. The organic binder may comprise a thermoplastic or thermoset binder, which after cure is a flexible material that can be burned out of an installed mounting mat. Examples of suitable organic binders include, but are not limited to acrylic latex, (meth)acrylic latex, copolymers of styrene and butadiene, vinylpyridine, acrylonitrile, copolymers of acrylonitrile and styrene, vinyl chloride, polyurethane, copolymers of vinyl acetate and ethylene, polyamides, silicones, and the like. Other resins include low temperature, flexible thermosetting resins such as unsaturated polyesters, epoxy resins and polyvinyl esters.

The organic binder may be included in the mounting mat in an amount of greater than 0 to about 20 weight percent, from about 0.5 to about 15 weight percent, from about 1 to about 10 weight percent and from about 2 to about 8 weight percent, based on the total weight of the mounting mat.

The mounting mat may include polymeric binder fibers instead of, or in addition to a resinous or liquid binder. These polymeric binder fibers may be used in amounts ranging from greater than 0 to about 20 percent by weight, from about 1 to about 15 weight percent, and from about 2 to about 10 weight percent, based upon 100 percent by weight of the total composition, to aid in binding the heat resistant inorganic fibers together. Suitable examples of binder fibers include polyvinyl alcohol fibers, polyolefin fibers such as polyethylene and polypropylene, acrylic fibers, polyester fibers, ethyl vinyl acetate fibers, nylon fibers and combinations thereof.

Typically, the organic binder is a sacrificial binder employed to initially bond the fibers together. By "sacrificial," it is meant that the organic binder will eventually be burned out of the mounting mat, leaving only the inorganic fibers, optionally intumescent material and optionally clay as the mounting mat for supporting the fragile structure within the metallic housing.

In addition to organic binders, the mounting mats may also include inorganic binder material. Without limitation, suitable inorganic binder materials include colloidal dispersions of alumina, silica, zirconia, and mixtures thereof.

According to certain embodiments, the mounting mat includes an effective amount of a clay material to further minimize the decrease in overall mat thickness, and corresponding low temperature performance loss, due to organic binder softening and fiber rearrangement. Without limitation, the clay material may be included in the intumescent mounting mat in an amount from about 1 to about 10 weight percent, based on the total weight of the mounting mat. The clay material may alternatively be included in the mounting mat in an amount from about 2 to about 8 weight percent, or in an amount from about 3 to 5 weight percent, based on the total weight of the mounting mat. Suitable clays that mat be included in the intumescent mounting mat include, without limitation, attapulgite, ball clay, bentonile, hectorite, kyanite, kaolinite, montmorillonite, palygorskite, saponite, sepiolite, silimanite, or combinations thereof.

According to certain embodiments, the mounting mat includes an effective amount of attapulgite clay. Suitable attapulgite clays are commercially available from Wesbond under the trade designation Wesil NS, Min-U-Gel 400P from ITC Industrials (Hunt Valley, Md.). PalyGcl 325NA from MinTech International (Bloomington, Ind.) and Super Gel B from Zemex Corporation (Attapulugus, Ga.). Without being bound to any particular theory, the elongated needle-like crystal structure of attapulgite clay may influence the manner in which the inorganic fibers contained within the mounting mat rearrange when the organic binder soften occurs in response to exposure to heat during operation of the exhaust gas treatment device.

According to certain embodiments, the clay material may also include a flocculating material and/or colloidal particulate material.

The mounting mat also includes an effective amount of antioxidant for delaying or otherwise retarding the oxidation of the organic binder contained in the mounting mat. According to certain embodiments, the antioxidant may be included in the mounting mat in an amount from about 0.1 to about 10 weight percent, based on the total weight of the mounting mat. The antioxidant material may also be included in an amount from about 0.3 to about 5 weight percent, or from about 0.5 to about 1.5 weight percent, based on the total weight of the mounting mat.

Suitable examples of antioxidant materials include primary antioxidants, secondary antioxidants, multifunctional antioxidants, and combinations thereof. Without limitation, non-limiting examples of primary antioxidants include sterically hindered phenolics and secondary aromatic amines. Suitable sterically hindered phenolics are commercially available from Elikochem (Villejust, France) under the trade designation Wingstay, from RT Vanderbilt (Norwalk Conn.) under the trade designations Agerite Resin and Vanox, and from Ciba Specialty Chemicals (High Point, N.C.) under the trade designation Irganox.

Suitable examples of secondary antioxidants include organophosphorus compounds which decompose peroxides and hydroperoxides into stable, non-radical products and thiosynergists which are very efficient for long-term thermal aging applications.

Multifunctional antioxidants optimally combine primary and secondary antioxidant functions in one antioxidant compound.

According to certain embodiments, blends of hindered phenolics and thiosynergist antioxidants may be used as the antioxidant material for the exhaust gas treatment device mounting mat.

The antioxidant material may be provided in the form of dispersions or emulsions of primary or mixtures of primary and secondary antioxidants. Suitable antioxidant dispersions are commercially available from Akron Dispersions (Akron, Ohio) under the trade designation Bostex, from Aquaspersions (West Yorkshire, UK) under the trade designation Aquanox, from Tiarco Chemical (Dalton, Ga.) under the trade designation Octolite, and from Great Lakes Chemical Co. (Indianapolis, Ind.) under the trade designations Lowinx, Durad and Anox.

Illustrative examples of antioxidant dispersions include Bostex 24, which is a dispersion of Wingstay L and Bostex 362A, which is 50% Wingstay L/DTDTDP synergist (a thiosynergist/secondary antioxidant). The thermal degradation temperature for Wingstay L (the antioxidant contained in the Bostex 362A dispersion) is greater than about 300° C. and the autoignition temperature is about 440° C. Therefore, the antioxidant material will not begin to degrade or combust until approximately the same temperature at which the organic binder begins to decompose and the intumescent material, such as vermiculite, in the mounting mat becomes active and begins to expand.

A particularly suitable antioxidant is commercially available from Akron Dispersions (Akron. Ohio) under the trade designation Bostex 362A. According to certain illustrative embodiments, the antioxidant material is pre-complexed with the organic binder material prior to addition to the remaining components of the mounting mat.

The mounting mat may be produced in any way known in the art for forming sheet-like materials. For example, conventional paper-making processes, either hand laid or machine laid, may be used to prepare the intumescent sheet material. A handsheet mold, a Fourdrinier paper machine, or a rotoformer paper machine can be employed to make the intumescent sheet material.

For example, using a papermaking process, the inorganic fibers, intumescent material, and antioxidant may be mixed together with a binder or other fibers capable of acting as a binder to form a mixture or slurry. The slurry of components may be flocculated by adding a flocculating agent to the slurry. The flocculated mixture or slurry is placed onto a papermaking machine to be formed into a ply or sheet of fiber containing paper. The sheet is dried by air drying or oven drying. For a more detailed description of standard papermaking techniques employed, sec U.S. Pat. No. 3,458,329, the disclosure of which is incorporated herein by reference.

Alternatively, the plies or sheets may be formed by vacuum casting the slurry. According to this method, the slurry of components is wet laid onto a pervious web. A vacuum is applied to the web to extract the majority of the moisture from the slurry, thereby forming a wet sheet. The wet plies or sheets are then dried, typically in an oven. The sheet may be passed through a set of rollers to compress the sheet prior to drying.

In other embodiments, the fibers may be processed into a mounting mat by conventional means such as dry air laying. The mat at this stage has very little structural integrity and is very thick relative to conventional catalytic converter and diesel trap mounting mats. The resultant mat can therefore be dry needled, as is commonly known in the art, to densify the mat and increase its strength.

Where the dry air layering technique is used, the mat may be alternatively processed by the addition of a binder to the mat by impregnation to form a discontinuous fiber composite. In this technique, the binder is added after formation of the mat, rather than forming the mat prepreg as noted hereinabove with respect to the conventional papermaking technique. This method of preparing the mat aids in maintaining fiber length by reducing breakage.

Methods of impregnation of the mat with the binder include complete submersion of the mat in a liquid binder system, or alternatively spraying the mat. In a continuous procedure, a fiber mat which can be transported in roll form, is unwound and moved, such as on a conveyer or scrim, past spray nozzles which apply the binder to the mat. Alternatively, the mat can be gravity-fed past the spray nozzles. The mat/binder prepreg is then passed between press rolls, which remove excess liquid and densify the prepreg to approximately its desired thickness. The densified prepreg may then be passed through an oven to remove any remaining solvent and if necessary to partially cure the binder to form a composite. The drying and curing temperature is primarily dependent upon the binder and solvent (if any) used. The composite can then either be cut or rolled for storage or transportation.

The mounting mat can also be made in a batch mode, by immersing a section of the mat in a liquid binder, removing the prepreg and pressing to remove excess liquid, thereafter drying to form the composite and storing or cutting to size.

It is noted that mounting mats may be too low in density for easy use in certain applications. Therefore, they may undergo further densification by any manner known in the art to provide a higher density. One such manner of densification is to needle punch the fibers so as to intertwine and entangle them. Additionally or alternatively, hydro-entangling methods may be used. Another alternative is to press the fibers into a mat form by rolling them through press rollers. Any of these methods of densification of the mats or a combination of these methods can be readily used to obtain a mounting mat of the correct and desired form.

Regardless of which of the above-described techniques are employed, the composite can be cut, such as by die stamping, to form mounting mats of exact shapes and sizes with reproducible tolerances. The mounting mat 20 exhibits suitable handling properties upon densification as by needling or the like, meaning it can be easily handled and is not so brittle as to crumble in one's hand like many other fiber blankets or mats. It can be easily and flexibly fitted or wrapped around the fragile structure 18 or like fragile structure without cracking, and then disposed within the catalytic converter housing 12. Generally, the mounting mat-wrapped fragile structure can be inserted into a housing or the housing can be built or otherwise fabricated around the mounting mat-wrapped fragile structure.

With respect to non-intumescent mounting mats, the mounting mat is capable of maintaining a minimum holding pressure of at least 10 kPa or at least 50 kPa, after undergoing 1000 mechanical cycles of a standard 1000 cycle gap expansion test conducted at a hot face temperature of about 300° C. with a mat gap bulk density of from about 0.3 to about 0.6 g/cm$^3$ and a percent gap expansion of about 2 percent. With respect to intumescent mounting mats, the mounting mat is capable of maintaining a minimum holding pressure of at least 10 kPa or at least 50 kPa after undergoing 1000 mechanical cycles of a standard 1000 cycle gap expansion test conducted at a hot face temperature of about 300° C., with a mat gap bulk density of from about 0.7 to about 1.25 g/cm$^3$, and a percent gap expansion of about 2 percent. It will be appreciated that this test is particularly suited for mounting mats to be used in holding heavier substrates in high G load applications in low temperature applications. Exhaust gas treatment devices for such applications include diesel catalyst structures and diesel particulate traps.

By the term "cycle" it is meant that the gap between the monolith (i.e. fragile structure) and housing is opened and closed over a specific distance and at a predetermined rate. In order to simulate realistic conditions, the expansion of the gap between a housing and a fragile structure of a given diameter may be determined by calculating the coefficient of thermal expansion of a conventional housing at a temperature of, for example, about 900° C. A final mat basis weight is then selected that will meet the criteria of the test, and provide a minimum holding force (Pmin) of greater than about 10 kPa after 1000 cycles. The goal is to provide adequate support at the lowest cost, so the minimum basis weight that satisfies the greater than about 10 kPa requirement may be selected.

In operation, the device experiences a significant change in temperature. Due to the differences in their thermal expansion coefficients, the housing may expand more than the support structure 18, such that the gap between these elements will increase slightly. In a typical case, the gap may expand and contract on the order of about 0.25 to about 0.5 mm during thermal cycling of the converter. The thickness and mounting density of the mounting mat is selected such that a minimum holding pressure of at least about 10 kPa is maintained under all conditions to prevent the fragile structure from vibrating loose. The mounting pressure exerted by the mounting mat 20 under these conditions permits accommodation of the thermal characteristics of the assembly without compromising the physical integrity of the constituent elements.

EXPERIMENTAL

The following examples are set forth merely to further illustrate the mounting mat and exhaust gas treatment device. The illustrative examples should not be construed as limiting the mounting mat, exhaust gas treatment device incorporating the mounting mat, or the methods of making the mounting mat or the exhaust gas treatment device in any manner.

Relative Expansion

The relative expansion of the mounting mat was evaluated in a single cycle expansion test. Example No. 1 represents a mounting mat comprising 47.5 weight percent Fiberfrax refractory ceramic fibers, 45 weight percent expandable vermiculite, 6.5 weight percent Hycar 26083 acrylic latex and 1 weight percent bentonite clay.

Example No. 2 represents a mounting mat comprising 47.5 weight percent Fiberfrax refractory ceramic fibers, 45 weight percent expandable vermiculite, 5.9 weight percent Hycar 26083 acrylic latex, 0.65 weight percent anti-oxidant (Bostex 362A) and 1 weight percent bentonite clay (Volclay).

Example No. 3 represents a mounting mat comprising 48.5 weight percent Fiberfrax refractory ceramic fibers, 45 weight percent expandable vermiculite, 5.9 weight percent Hycar 26083 acrylic latex and 0.65 weight percent anti-oxidant (Bostex 362A).

Example No. 4 represents a mounting mat comprising 47.5 weight percent Fiberfrax refractory ceramic fibers, 45 weight percent expandable vermiculite, 5.9 weight percent Hycar 26083 acrylic latex, 0.65 weight percent anti-oxidant (Bostex 362A) and 1 weight percent attipulgite clay (Wesil).

The mats of Examples 1 to 4 were positioned between two quartz rams. The mounting mats were compressed by applying a constant load of about 50 psi to the mats. The mats were then allowed to relax for about 5 minutes at room temperature. The thickness of each mat was then measured as the mats were heated to 850° C. (15° C. minute). The results of the single cycle expansion testing are reported in FIG. 2.

Figure 2:
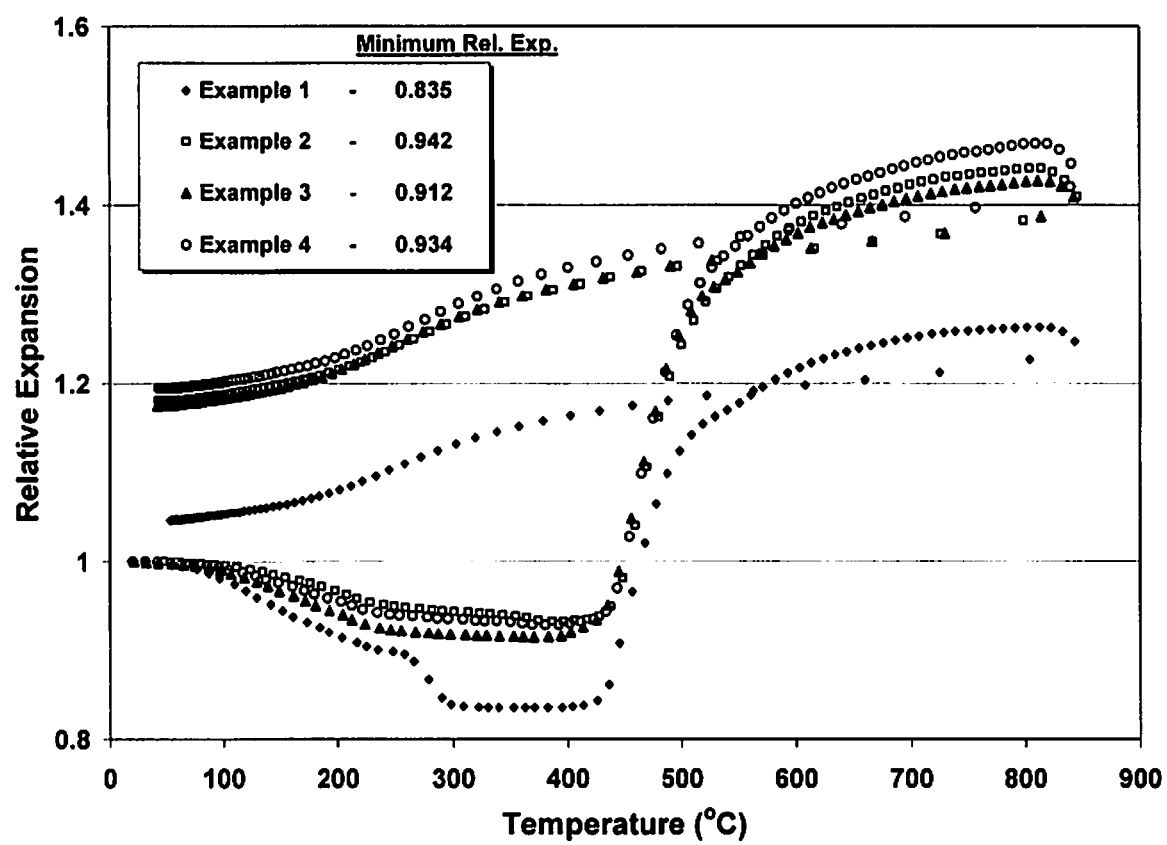
FIG. 2 is a graph depicting the relative expansion of the inventive intumescent mounting mat as compared to a prior art mounting mat as a function of temperature (° C.).
Figure 3:
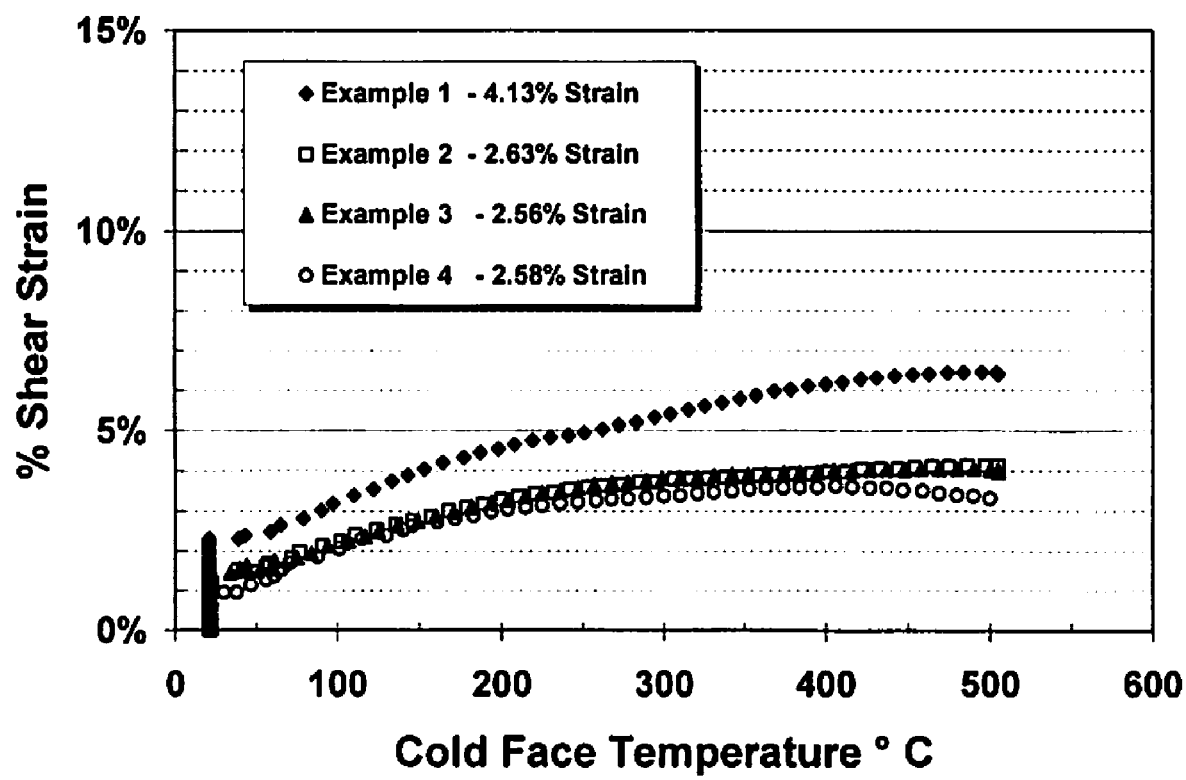
FIG. 3 is a graph depicting the shear strength of the inventive intumescent mounting mat as compared to a prior art mounting mat as a function of temperature (° C.).

The graph shown in FIG. 2 shows the relative expansion of intumescent mounting mats as a function of temperature. The results show that there is an initial negative expansion of intumescent mounting mats that contain an organic binder around 200° C. in response to the softening of the binder. Without being bound to any particular theory, it is believe that the softening of the organic binder permits rearrangement of the inorganic fibers that are present in the mounting mat.

Example 1, which is an intumescent mounting mat containing fibers, intumescent material, organic binder and bentonite clay exhibits negative expansion from 100° C. through about 400° C., with a sharp increase in negative expansion at about 275° C. through 300° C. due to oxidation of the organic binder.

Examples 2 and 4, which are intumescent mounting mats containing fibers, intumescent material organic binder, antioxidant, and clay exhibit an improved negative expansion in the temperature range of 100° C. through about 400° C. as compared to Example 1.

Example 3, which is an intumescent mounting mat containing fibers, intumescent material, organic binder and anti-oxidant, but no clay, exhibits an improved negative expansion in the temperature range of 100° C. through about 400° C. as compared to an intumescent mounting mat containing bentonite clay, but not antioxidant. The mat of Example 3 also exhibits a negative expansion that is similar to the negative expansion exhibited by intumescent mounting mats containing an antioxidant and clay. Thus, it is demonstrated that the inclusion of an antioxidant alone to an intumescent mounting mat improves the negative expansion of the mat for low temperature application up to about 400° C.

Example No. 5 represents a mounting mat comprising 67.5 weight percent ISOFRAX magnesia-silicate fibers, 20 weight percent expandable vermiculite, 10 weight percent Hycar 26083 acrylic latex and 2.5 weight percent bentonite clay (Volclay).

Example No. 6 represents a mounting mat comprising 67.5 weight percent ISOFRAX magnesia-silicate fibers, 20 weight percent expandable vermiculite, 9.5 weight percent Hycar 26083 acrylic latex, 0.5 weight percent antioxidant (Bostex 362A) and 2.5 weight percent bentonite clay (Volclay).

Example No. 7 represents a mounting mat comprising 65 weight percent ISOFRAX magnesia-silicate fibers, 20 weight percent expandable vermiculite, 9.5 weight percent Hycar 26083 acrylic latex, 0.5 weight percent antioxidant (Bostex 362A) and 5 weight percent attapuglite clay (Wesil).

The mats of Examples 5 to 7 were positioned between two quartz rams. The mounting mats were compressed by applying a constant load of about 50 psi to the mats. The mats were then allowed to relax for about 5 minutes at room temperature. The thickness of each mat was then measured as the mats were heated to 850° C. (15° C./minute). The results of the single cycle expansion testing are reported in FIG. 4.

Figure 4:
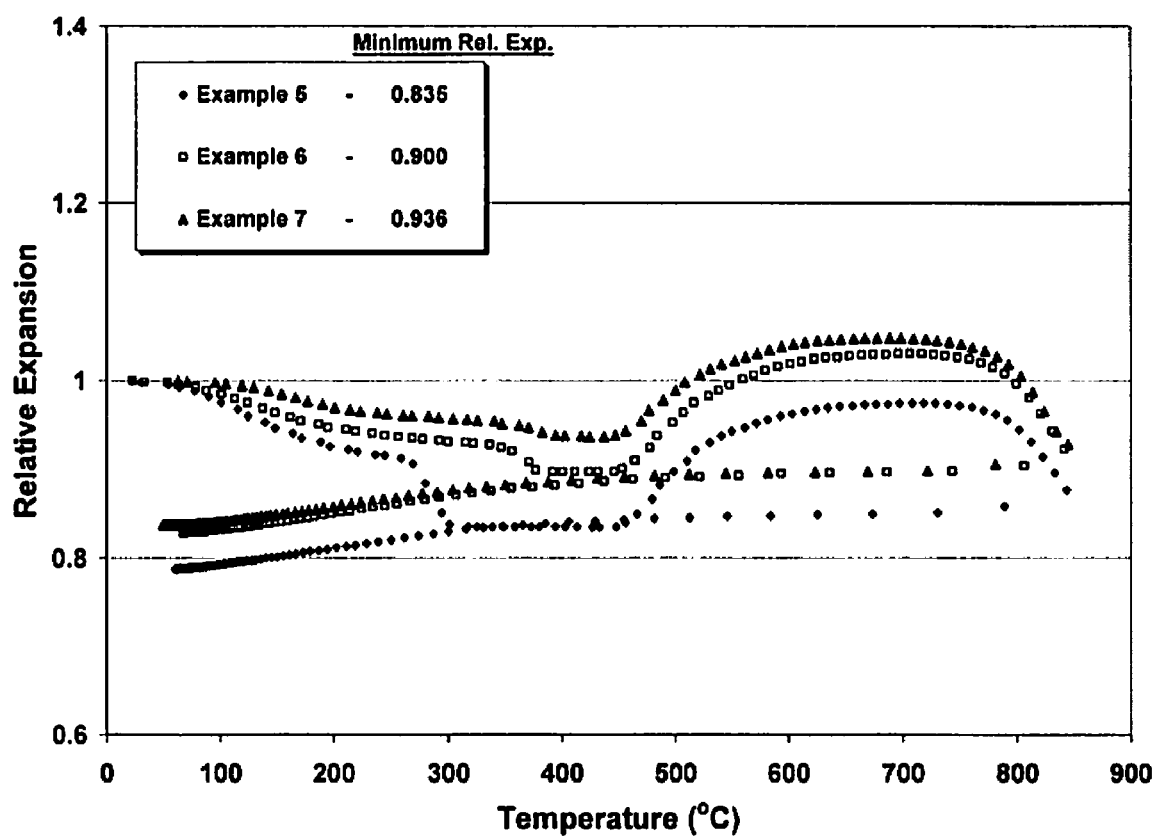
FIG. 4 is a graph depicting the relative expansion of the inventive intumescent mounting mat as compared to a prior art mounting mat as a function of temperature (° C.).

The graph shown in FIG. 4 shows the relative expansion of intumescent mounting mats as a function of temperature. The results show that there is an initial negative expansion of intumescent mounting mats that contain an organic binder around 200° C. in response to the softening of the binder. Without being bound to any particular theory, it is believe that the softening of the organic binder permits rearrangement of the inorganic fibers that are present in the mounting mat.

Example 5, which is an intumescent mounting mat containing fibers, intumescent material and organic binder, but neither clay nor antioxidant, continues to exhibit further negative expansion from 200° C. through about 300° C., with a sharp increase in negative expansion at about 275° C. through 300° C. due to oxidation of the organic binder.

Example 6, which is an intumescent mounting mat containing fibers, intumescent material and organic binder, and 0.5 weight percent antioxidant, shows an improved negative expansion in the temperature range of 200° C. through about 400° C.

Example 7, which is an intumescent mounting mat containing fibers, intumescent material and organic binder, 5 weight percent clay and 0.5 weight percent antioxidant, exhibits the most improved negative expansion as compared to the intumescent mat containing no clay or antioxidant or the mat containing 0.5 weight percent antioxidant. Thus, it is demonstrated that the inclusion of clay and antioxidant to an intumescent mounting mat improves the negative expansion of the mat for low temperature application up to about 400° C.

Shear Strength

The shear strength throughout a range of temperatures from ambient to about 500° C. of intumescent mounting mats containing clay only, antioxidant only or antioxidant in combination with clay were evaluated and compared to an intumescent mounting mat without these additives.

Figure 5:
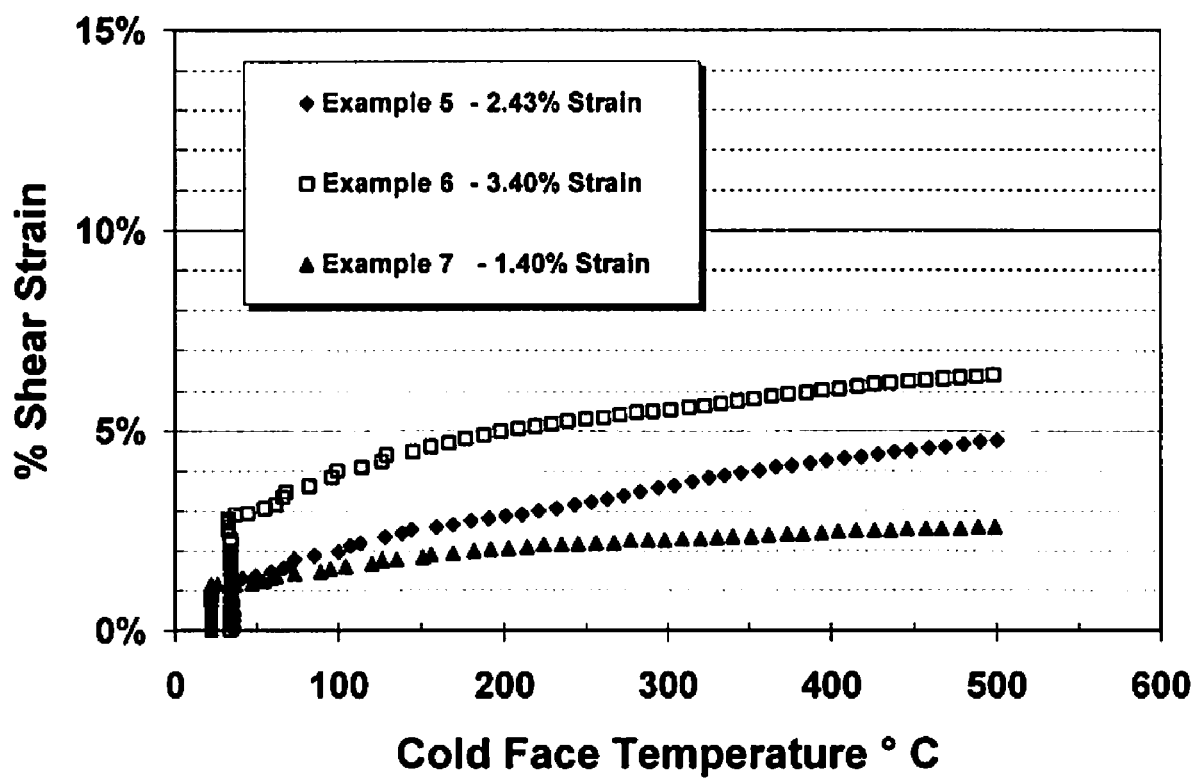
FIG. 5 is a graph depicting the shear strength of the inventive intumescent mounting mat as compared to a prior art mounting mat as a function of temperature (° C.).

A constant load was applied to intumescent mounting mat samples in a fixture. The shear strain (that is, the amount of deflection in the material) was measured as a function of temperatures. The results of the shear strength testing are shown in FIG. 5. The results show that the use of an antioxidant leads to an increase in the overall resistance to shear strain as compared to a mounting mat containing no antioxidant. Example 3, which represents a mounting mat including an antioxidant only but no clay, exhibits a resistance to shear strain that is greater than a mounting mat containing clay but not antioxidant (Example 1) or a mounting mat containing a combination of either attapulgite or bentonite clay and antioxidant (Examples 2 and 4).

Further results of the shear strength testing are shown in FIG. 5. These results show that the use of a combination of antioxidant and clay leads to an increase in the overall resistance to shear strain as compared to a mounting mat containing no antioxidant.

These mats are advantageous to the catalytic converter and diesel particulate trap industry. The mounting mats can be die cut and are operable as resilient supports in a thin profile, providing case of handling, and in a flexible form, so as to be able to provide a total wrap of the catalyst support structure, if desired, without cracking. Alternatively, the mounting mat may be integrally wrapped about the entire circumference or perimeter of at least a portion of the catalyst support structure. The mounting mat may also be partially wrapped and include an end-seal as currently used in some conventional converter devices, if desired, to prevent gas by-pass.

The mounting mats described above are also useful in a variety of applications such as conventional automotive catalytic converters for, among others, motorcycles and other small engine machines, and automotive preconverters, as well as high temperature spacers, gaskets, and even future generation automotive underbody catalytic converter systems. Generally, they can be used in any application requiring a mat or gasket to exert holding pressure at room temperature and, more importantly, to provide the ability to maintain the holding pressure at elevated temperature, including during thermal cycling.

The mounting mat material may be used as end cone insulation in an exhaust gas treatment device. According to certain embodiments, an end cone for an exhaust gas treatment device is provided. The end cone generally comprises an outer metallic cone, an inner metallic cone and end cone insulation that is disposed within the gap or space between the outer and inner metallic end cones.

According to other embodiments, the end cone may comprise an outer metallic cone and at least one layer of cone insulation that is positioned adjacent to the inner surface of the outer metallic cone. According to these embodiments, the end cone assembly is not provided with an inner metallic cone. Rather, the cone insulation is rigidized in some manner to provide a self-supporting cone structure that is resistant to the high temperature gases flowing through the device.

An exhaust gas treatment device including at least one end cone is provided. The exhaust gas treatment device comprises a housing, a fragile structure positioned within the housing, an inlet and an outlet end cone assemblies for attaching exhaust pipes to the housing, each end cone assembly comprising an inner end cone housing and an outer end cone housing; and end cone insulation comprising heat treated biosoluble fibers and optionally intumescent material positioned between the inner and outer cone housings.

The mounting mats described above can also be used in catalytic converters employed in the chemical industry which are located within exhaust or emission stacks, including those which contain fragile honeycomb type structures that need to be protectively mounted.

The mounting mat material may be used as passive fire protection or as a tire stop material. The mounting mats may also be used to wrap heat generating elements within fuel cells.

While the mounting mat and exhaust gas treatment device have been described in connection with various illustrative embodiments, it is to be understood that other similar embodiments may be used or modifications and additions may be made to the described embodiments for performing the same function disclosed herein without deviating therefrom. The embodiments described above are not necessarily in the alternative, as various embodiments may be combined to provide the desired characteristics. Therefore, the mounting mat and exhaust gas treatment device should not be lim-

The invention claimed is:

1. A mounting mat for an exhaust gas treatment device comprising:
   inorganic fibers selected from the group consisting of high alumina polycrystalline fibers, ceramic fibers, mullite fibers, glass fibers, biosoluble fibers, quartz fibers, silica fibers, and combinations thereof;
   organic binder;
   antioxidant; and
   optionally an intumescent material.

2. The mounting mat of claim 1, wherein the high alumina polycrystalline fibers comprise the fiberization product of about 72 to about 100 weight percent alumina and about 0 to about 28 weight percent silica.

3. The mounting mat of claim 1, wherein the ceramic fibers comprise alumino-silicate fibers comprising the fiberization product of about 45 to about 72 weight percent alumina and about 28 to about 55 weight percent silica.

4. The mounting mat of claim 1, wherein the biosoluble fibers comprise magnesia-silica fibers comprising the fiberization product of about 65 to about 86 weight percent silica, from about 14 to about 35 weight percent magnesia and about 5 weight percent of less impurities.

5. The mounting mat of claim 4, wherein the magnesia-silica fibers comprise the fiberization product of about 70 to about 86 weight percent silica, about 14 to about 30 weight percent magnesia and about 5 weight percent or less impurities.

6. The mounting mat of claim 5, wherein the magnesia-silica fibers comprise the fiberization product of about 70 to about 80 weight percent silica, about 18 to about 27 weight percent magnesia and 0 to 4 weight percent impurities.

7. The mounting mat of claim 1, wherein the biosoluble fibers comprise calcia-magnesia-silica fibers comprising the fiberization product of about 45 to about 90 weight percent silica, greater than 0 to about 45 weight percent calcia, and greater than 0 to about 35 weight percent magnesia.

8. The mounting mat of claim 7, wherein the calcia-magnesia-silica fibers comprise the fiberization product of about 60 to about 70 weight percent silica, from about 16 to about 35 weight percent calcia, and from about 4 to about 19 weight percent magnesia.

9. The mounting mat of claim 8, wherein the calcia-magnesia-silica fibers comprise the fiberization product of about 61 to about 67 weight percent silica, from about 27 to about 33 weight percent calcia, and from about 2 to about 7 weight percent magnesia.

10. The mounting mat of claim 1, wherein the intumescent material is selected from the group consisting of unexpanded vermiculite, ion exchanged vermiculite, heat treated vermiculite, expandable graphite, hydrobiotite, water-swelling tetrasilicic flourine mica, alkaline metal silicates, or mixtures thereof.

11. The mounting mat of claim 10, wherein the intumescent material comprises unexpanded vermiculite.

12. The mounting mat of claim 1, wherein the antioxidant is selected from the group consisting of primary antioxidants, secondary antioxidants, multifunctional antioxidants, and combinations thereof.

13. The mounting mat of claim 1, wherein the inorganic fibers comprise magnesia-silica fibers, wherein the intumescent material comprises vermiculite and wherein the antioxidant comprises a blend of primary and secondary antioxidants.

14. The mounting mat of claim 13, wherein the mounting mat comprises from about 25 to about 100 weight percent magnesia-silica fibers, from about 1 to about 30 weight percent vermiculite and from about 0.1 to about 10 of the antioxidant.

15. The mounting mat of claim 1 further comprising clay.

16. The mounting mat of claim 15, wherein said clay is selected from the group consisting of attapulgite, ball clay, bentonite, hectorite, kyanite, kaolinite, montmorillonite, palygorskite, saponite, sepiolite, silimanite or combinations thereof.

17. The mounting mat of claim 16, wherein the clay comprises attapulgite clay.

18. An exhaust gas treatment device comprising:
   a housing;
   a fragile structure resiliently mounted within the housing; and
   a mounting mat disposed in a gap between the housing and the fragile structure, wherein the mounting mat comprising inorganic fibers selected from the group consisting of high alumina polycrystalline fibers, mullite fibers, ceramic fibers, glass fibers, biosoluble fibers, quartz fibers, silica fibers, and combinations thereof, organic binder, antioxidant and optionally intumescent material.

19. The exhaust gas treatment device of claim 18, wherein the high alumina polycrystalline fibers comprise the fiberization product of about 72 to about 100 weight percent alumina and about 0 to about 28 weight percent silica.

20. The exhaust gas treatment device of claim 18, wherein the ceramic fibers comprise alumino-silicate fibers comprising the fiberization product of about 45 to about 75 weight percent alumina and about 25 to about 55 weight percent silica.

21. The exhaust gas treatment device of claim 18, wherein the biosoluble fibers comprise magnesia-silica fibers comprising the fiberization product of about 65 to about 86 weight percent silica and from about 14 to about 35 weight percent magnesia.

22. The exhaust gas treatment device of claim 21, wherein the magnesia-silica fibers comprise the fiberization product of about 70 to about 86 weight percent silica, about 14 to about 30 weight percent magnesia and about 5 weight percent or less impurities.

23. The exhaust gas treatment device of claim 22, wherein the magnesia-silica fibers comprise the fiberization product of about 70 to about 80 weight percent silica, about 18 to about 27 weight percent magnesia and 0 to 4 weight percent impurities.

24. The exhaust gas treatment device of claim 18, wherein the biosoluble fibers comprise calcia-magnesia-silica fibers comprising the fiberization product of about 45 to about 90 weight percent silica, greater than 0 to about 45 weight percent calcia, and greater than 0 to about 35 weight percent magnesia.

25. The exhaust gas treatment device of claim 24, wherein the calcia-magnesia-silica fibers comprise the fiberization product of about 60 to about 70 weight percent silica, from about 16 to about 35 weight percent calcia, and from about 4 to about 19 weight percent magnesia.

26. The exhaust gas treatment device of claim 25, wherein the calcia-magnesia-silica fibers comprise the fiberization product of about 61 to about 67 weight percent silica, from about 27 to about 33 weight percent calcia, and from about 2 to about 7 weight percent magnesia.

27. The exhaust gas treatment device of claim 18, wherein the intumescent material is selected from the group consisting of unexpanded vermiculite, ion exchanged vermiculite, heat treated vermiculite, expandable graphite, hydrobiotite, water-swelling tetrasilicic flourine mica, alkaline metal silicates, or mixtures thereof.

28. The exhaust gas treatment device of claim 27, wherein the intumescent material comprises unexpanded vermiculite.

29. The exhaust gas treatment device of claim 18, wherein the antioxidant is selected from the group consisting of primary antioxidants, secondary antioxidants, multifunctional antioxidants and combinations thereof.

30. The exhaust gas treatment device of claim 18, wherein the inorganic fibers comprise magnesia-silica fibers, wherein the intumescent material comprises vermiculite and wherein the antioxidant comprises and wherein the antioxidant comprises a blend of primary and secondary antioxidants.

31. The exhaust gas treatment device of claim 30, wherein the mounting mat comprises from about 25 to about 100 weight percent magnesia-silica fibers, from about 1 to about 30 weight percent vermiculite and from about 0.1 to about 10 of the antioxidant.

32. The exhaust gas treatment device of claim 18, wherein the mounting mat further comprises clay.

33. The exhaust gas treatment device of claim 32, wherein said clay is selected from the group consisting of attapulgite, ball clay, bentonite, hectorite, kyanite, kaolinite, montmorillonite, palygorskite, saponite, sepiolite, silimanite or combinations thereof.

34. The exhaust gas treatment device of claim 33, wherein the clay comprises attapulgite clay.

35. The exhaust gas treatment device of claim 18, wherein the inorganic fibers comprise magnesia-silica fibers, wherein the intumescent material comprises vermiculite, wherein the clay comprises attapulgite clay, and wherein the antioxidant comprises a blend of thiosynergist and secondary antioxidants.

36. The exhaust gas treatment device of claim 35, wherein the mounting mat comprises from about 25 to about 100 weight percent magnesia-silica fibers, from about 1 to about 30 weight percent vermiculite, from about 1 to about 10 weight percent attapulgite clay and from about 0.1 to about 10 of the antioxidant.

37. The exhaust gas treatment device of claim 18, wherein the device is a catalytic converter or diesel particulate trap.

38. An end cone for an exhaust gas treatment device comprising:
   outer metallic cone;
   an inner metallic cone; and
   cone insulation disposed between said outer and inner metallic end cones, said cone insulation comprising inorganic fibers selected from the group consisting of high alumina polycrystalline fibers, mullite fibers, ceramic fibers, glass fibers, biosoluble fibers, quartz fibers, silica fibers, and combinations thereof, organic binder, antioxidant and optionally intumescent material.

39. The end cone for an exhaust gas treatment device of claim 38, wherein the cone insulation further comprises clay.

40. An end cone for an exhaust gas treatment device comprising:
   an outer metallic cone; and
   self-supporting cone insulation comprising inorganic fibers selected from the group consisting of high alumina polycrystalline fibers, mullite fibers, ceramic fibers, glass fibers, biosoluble fibers, quartz fibers, silica fibers, and combinations thereof, organic binder, antioxidant and optionally intumescent material disposed adjacent the inner surface of said outer metallic end cone.

41. The end cone for an exhaust gas treatment device of claim 40, wherein the self-supporting end cone insulation further comprises clay.

42. A mounting mat for an exhaust gas treatment device consisting essentially of:
   inorganic fibers;
   organic binder;
   antioxidant; and
   optionally an intumescent material.

43. The mounting mat of claim 42, wherein the inorganic fibers are selected from the group consisting of high alumina polycrystalline fibers, ceramic fibers, mullite fibers, glass fibers, biosoluble fibers, quartz fibers, silica fibers, and combinations thereof.

44. The mounting mat of claim 43, wherein the high alumina polycrystalline fibers comprise the fiberization product of about 72 to about 100 weight percent alumina and about 0 to about 28 weight percent silica.

45. The mounting mat of claim 43, wherein the ceramic fibers comprise alumino-silicate fibers comprising the fiberization product of about 45 to about 72 weight percent alumina and about 28 to about 55 weight percent silica.

46. The mounting mat of claim 43, wherein the biosoluble fibers comprise magnesia-silica fibers comprising the fiberization product of about 65 to about 86 weight percent silica, from about 14 to about 35 weight percent magnesia and about 5 weight percent of less impurities.

47. The mounting mat of claim 43, wherein the biosoluble fibers comprise calcia-magnesia-silica fibers comprising the fiberization product of about 45 to about 90 weight percent silica, greater than 0 to about 45 weight percent calcia, and greater than 0 to about 35 weight percent magnesia.

48. The mounting mat of claim 42, wherein the intumescent material is selected from the group consisting of unexpanded vermiculite, ion exchanged vermiculite, heat treated vermiculite, expandable graphite, hydrobiotite, water-swelling tetrasilicic flourine mica, alkaline metal silicates, or mixtures thereof.

49. The mounting mat of claim 42, wherein the antioxidant is selected from the group consisting of primary antioxidants, secondary antioxidants, multifunctional antioxidants, and combinations thereof.

50. The mounting mat of claim 42, wherein the inorganic fibers comprise magnesia-silica fibers, wherein the intumescent material comprises vermiculite and wherein the antioxidant comprises a blend of primary and secondary antioxidants.

51. The mounting mat of claim 50, wherein the mounting mat comprises from about 25 to about 100 weight percent magnesia-silica fibers, from about 1 to about 30 weight percent vermiculite and from about 0.1 to about 10 of the antioxidant.

52. The mounting mat of claim 42 further comprising clay.

53. The mounting mat of claim 52, wherein said clay is selected from the group consisting of attapulgite, ball clay, bentonite, hectorite, kyanite, kaolinite, montmorillonite, palygorskite, saponite, sepiolite, silimanite or combinations thereof.

54. An exhaust gas treatment device comprising:
   a housing;
   a fragile structure resiliently mounted within the housing; and
   a mounting mat disposed in a gap between the housing and the fragile structure, wherein the mounting mat consists essentially of inorganic fibers, organic binder, antioxidant and optionally intumescent material.

55. The exhaust gas treatment device of claim 54, wherein the inorganic fibers are selected from the group consisting of high alumina polycrystalline fibers, mullite fibers, ceramic fibers, glass fibers, biosoluble fibers, quartz fibers, silica fibers, and combinations thereof.

56. The exhaust gas treatment device of claim 55, wherein the high alumina polycrystalline fibers comprise the fiberization product of about 72 to about 100 weight percent alumina and about 0 to about 28 weight percent silica.

57. The exhaust gas treatment device of claim 55, wherein the ceramic fibers comprise alumino-silicate fibers comprising the fiberization product of about 45 to about 75 weight percent alumina and about 25 to about 55 weight percent silica.

58. The exhaust gas treatment device of claim 55, wherein the biosoluble fibers comprise magnesia-silica fibers comprising the fiberization product of about 65 to about 86 weight percent silica and from about 14 to about 35 weight percent magnesia.

59. The exhaust gas treatment device of claim 55, wherein the biosoluble fibers comprise calcia-magnesia-silica fibers comprising the fiberization product of about 45 to about 90 weight percent silica, greater than 0 to about 45 weight percent calcia, and greater than 0 to about 35 weight percent magnesia.

60. The exhaust gas treatment device of claim 54, wherein the intumescent material is selected from the group consisting of unexpanded vermiculite, ion exchanged vermiculite, heat treated vermiculite, expandable graphite, hydrobiotite, water-swelling tetrasilicic flourine mica, alkaline metal silicates, or mixtures thereof.

61. The exhaust gas treatment device of claim 54, wherein the antioxidant is selected from the group consisting of primary antioxidants, secondary antioxidants, multifunctional antioxidants and combinations thereof.

62. The exhaust gas treatment device of claim 54, wherein the inorganic fibers comprise magnesia-silica fibers, wherein the intumescent material comprises vermiculite and wherein the antioxidant comprises a blend of primary and secondary antioxidants.

63. The exhaust gas treatment device of claim 62, wherein the mounting mat comprises from about 25 to about 100 weight percent magnesia-silica fibers, from about 1 to about 30 weight percent vermiculite and from about 0.1 to about 10 of the antioxidant.

64. The exhaust gas treatment device of claim 54, wherein the mounting mat further comprises clay.

65. The exhaust gas treatment device of claim 64, wherein said clay is selected from the group consisting of attapulgite, ball clay, bentonite, hectorite, kyanite, kaolinite, montmorillonite, palygorskite, saponite, sepiolite, silimanite or combinations thereof.

66. The exhaust gas treatment device of claim 65, wherein the inorganic fibers comprise magnesia-silica fibers, wherein the intumescent material comprises vermiculite, wherein the clay comprises attapulgite clay, and wherein the antioxidant comprises and wherein the antioxidant comprises a blend of thiosynergist and secondary antioxidants.

67. The exhaust gas treatment device of claim 54, wherein the mounting mat comprises from about 25 to about 100 weight percent magnesia-silica fibers, from about 1 to about 30 weight percent vermiculite, from about 1 to about 10 weight percent attapulgite clay and from about 0.1 to about 10 of the antioxidant.

68. The exhaust gas treatment device of claim 54, wherein the device is a catalytic converter or diesel particulate trap.

69. An end cone for an exhaust gas treatment device comprising:
    outer metallic cone;
    an inner metallic cone; and
    cone insulation disposed between said outer and inner metallic end cones, said cone insulation consisting essentially of inorganic fibers, organic binder, antioxidant and optionally intumescent material.

70. The end cone for an exhaust gas treatment device of claim 69, wherein the cone insulation further comprises clay.

71. An end cone for an exhaust gas treatment device comprising:
    an outer metallic cone; and
    self-supporting cone insulation consisting essentially of inorganic fibers, organic binder, antioxidant and optionally intumescent material disposed adjacent the inner surface of said outer metallic end cone.

72. The end cone for an exhaust gas treatment device of claim 71, wherein the self-supporting end cone insulation further comprises clay.

* * * * *